United States Patent
Yokoyama et al.

(10) Patent No.: US 9,377,944 B2
(45) Date of Patent: Jun. 28, 2016

(54) INFORMATION PROCESSING DEVICE, INFORMATION PROCESSING METHOD, AND INFORMATION PROCESSING PROGRAM

(71) Applicant: Panasonic Intellectual Property Corporation of America, Torrance, CA (US)

(72) Inventors: Ryo Yokoyama, Kanagawa (JP); Yuji Kunitake, Kyoto (JP); Yasuo Kohashi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 214 days.

(21) Appl. No.: 14/131,860

(22) PCT Filed: May 23, 2013

(86) PCT No.: PCT/JP2013/003290
§ 371 (c)(1),
(2) Date: Jan. 9, 2014

(87) PCT Pub. No.: WO2013/175798
PCT Pub. Date: Nov. 28, 2013

(65) Prior Publication Data
US 2014/0195935 A1 Jul. 10, 2014

(30) Foreign Application Priority Data
May 25, 2012 (JP) .................................. 2012-119643

(51) Int. Cl.
| G06F 3/0481 | (2013.01) |
| G06F 3/0488 | (2013.01) |
| G06F 1/16 | (2006.01) |
| G06F 3/01 | (2006.01) |
| G06F 3/0484 | (2013.01) |
| G06F 3/0486 | (2013.01) |
| G06F 3/0346 | (2013.01) |
| G06F 3/14 | (2006.01) |
| G09G 5/14 | (2006.01) |

(52) U.S. Cl.
CPC ............ G06F 3/0488 (2013.01); G06F 1/1616 (2013.01); G06F 1/1641 (2013.01);
(Continued)

(58) Field of Classification Search
CPC ............ G06F 3/00; G06F 3/01; G06F 3/017; G06F 3/041; G06F 3/048; G06F 3/14; G06F 3/1641; G06F 3/1647; G06F 3/0481; G06F 3/0482; G06F 3/0483; G06F 3/0484; G06F 3/0488; G06F 1/1626
See application file for complete search history.

(56) References Cited

U.S. PATENT DOCUMENTS 8,881,053 B2 * 11/2014 Sirpal .................. G06F 1/1616
715/781
2007/0192722 A1 8/2007 Kokubo
(Continued)

FOREIGN PATENT DOCUMENTS

| JP | 2005-149190 A | 6/2005 |
| JP | 2007-213430 A | 8/2007 |

(Continued)

OTHER PUBLICATIONS

International Search Report for PCT/JP2013/003290 dated Aug. 27, 2013.

Primary Examiner — Xiomar L Bautista
(74) Attorney, Agent, or Firm — Pearne & Gordon LLP

(57) ABSTRACT

Disclosed is an information processing apparatus that allows the user to operate a plurality of applications simultaneously displayed on touch panels, using a hand that holds the terminal. Information processing apparatus includes touch panels that simultaneously displays a plurality of applications. Touch panel coordinate management section determines whether or not an enabling operation to enable a display control for applications is received. Tilt detection section detects whether or not information processing apparatus is tilted, when the enabling operation is received. Application control section and display control section move application displayed on touch panel positioned higher than touch panel toward application displayed on touch panel positioned lower than touch panel, when information processing apparatus is tilted.

12 Claims, 9 Drawing Sheets

(52) U.S. Cl.
CPC ............ *G06F 3/017* (2013.01); *G06F 3/0346* (2013.01); *G06F 3/0484* (2013.01); *G06F 3/0486* (2013.01); *G06F 3/04817* (2013.01); *G06F 3/04886* (2013.01); *G06F 3/1431* (2013.01); *G09G 5/14* (2013.01)

(56) References Cited

U.S. PATENT DOCUMENTS

| | | |
|---|---|---|
| 2010/0259494 A1 | 10/2010 | Kii |
| 2011/0157057 A1 | 6/2011 | Hata |
| 2011/0285631 A1* | 11/2011 | Imamura ............... G06F 1/1616 345/168 |
| 2012/0319943 A1* | 12/2012 | Tamura ................. G06F 1/1647 345/156 |
| 2014/0157142 A1* | 6/2014 | Heinrich ............. H04L 67/1095 715/744 |
| 2015/0228104 A1* | 8/2015 | Edwards ................. G06T 13/00 345/474 |
| 2015/0242092 A1* | 8/2015 | Van Os ............... G06F 3/04817 715/765 |

FOREIGN PATENT DOCUMENTS

| | | |
|---|---|---|
| JP | 2010-250463 A | 11/2010 |
| JP | 2011-134130 A | 7/2011 |
| JP | 2011-204129 A | 10/2011 |

* cited by examiner

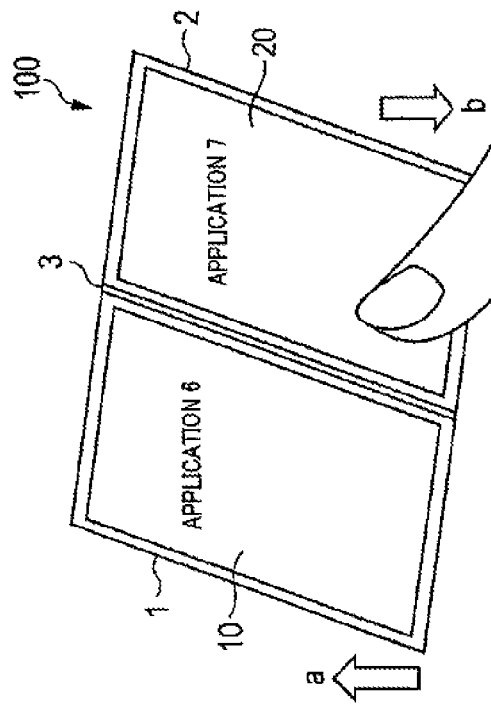
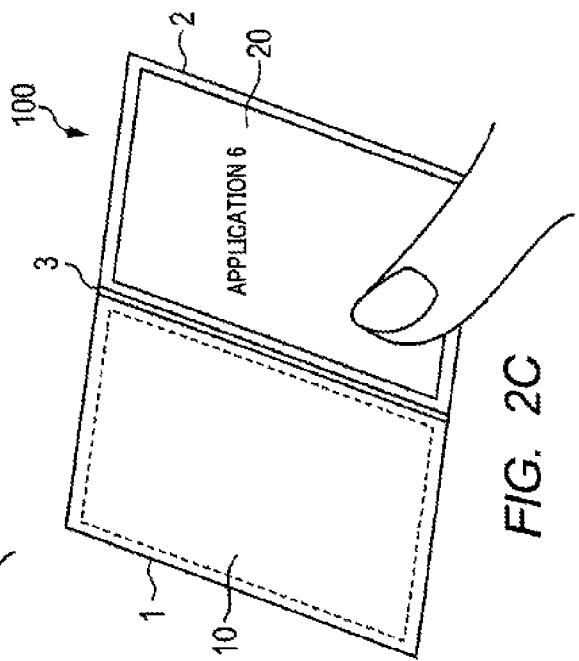
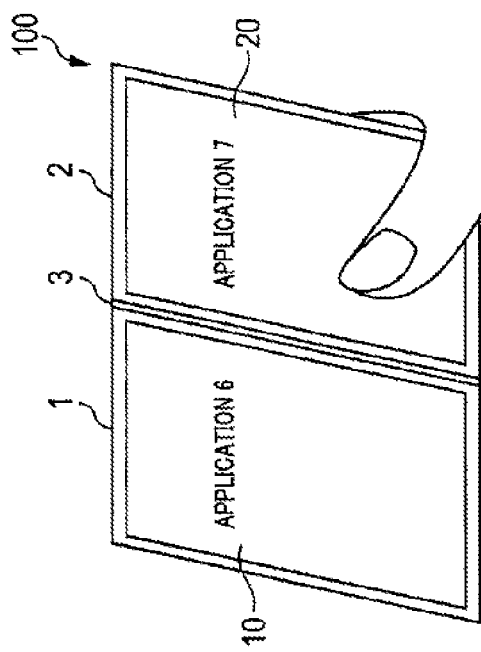

INFORMATION PROCESSING DEVICE, INFORMATION PROCESSING METHOD, AND INFORMATION PROCESSING PROGRAM

TECHNICAL FIELD

The present invention relates to an information processing apparatus, an information processing method and an information processing program applied to a terminal that includes a touch panel.

BACKGROUND ART

In recent years, a touch panel screen of a portable terminal such as a smart phone or a tablet personal computer has been increased in size.

A terminal that includes a touch panel having a large screen (hereinafter, referred to as a "large screen terminal") is disclosed in PTL 1, for example. In the terminal disclosed in PTL 1, two housings that respectively include touch panels can be opened and closed via a hinge. Thus, a user may spread two touch panels to use two touch panels as one large screen touch panel.

CITATION LIST

Patent Literature

PTL 1
Japanese Patent Application Laid-Open No. 2010-250463

SUMMARY OF INVENTION

Technical Problem

However, when a plurality of application software programs (hereinafter, referred to as "applications") are simultaneously displayed, a user encounters the following problems in operation of a large screen touch panel.

When the user operates the large screen terminal by one hand while holding the large screen terminal by the hand, a finger (for example, a thumb) used to perform the operation comes in contact with a touch panel and does not reach the entire screen. Accordingly, the user can operate an application displayed in the vicinity of the hand that holds the terminal because the finger of the hand reaches the application, but cannot operate an application that is not displayed in the vicinity of the hand that holds the terminal because the finger of the hand does not reach the application.

An object of the invention is to allow a user to operate a plurality of applications that are simultaneously displayed on a touch panel, using a hand holding a terminal.

Solution to Problem

An information processing apparatus according to an aspect of the present invention includes a touch panel that simultaneously displays a plurality of applications in a row, the information processing apparatus including: a detection section that detects whether or not the information processing apparatus is tilted; and a control section that performs, when the information processing apparatus is tilted, a first display control for moving a first application displayed in a first region located higher than a second region in the touch panel toward a second application displayed in the second region located lower than the first region in the touch panel.

An information processing method according to an aspect of the present invention is an information processing method to be performed by a terminal including a touch panel that simultaneously displays a plurality of applications in a row, the method including: detecting whether the terminal is tilted; and performing, when the terminal is tilted, a first display control for moving a first application displayed in a first region located higher than a second region in the touch panel toward a second application displayed in the second region located lower than the first region in the touch panel.

An information processing program according to an aspect of the present invention is an information processing program causing a computer of a terminal to execute processing, the terminal including a touch panel that simultaneously displays a plurality of applications in a row, the program causing the computer to execute the processing including: detecting whether or not the terminal is tilted; and performing, when the terminal is tilted, a first display control for moving a first application displayed in a first region located higher than a second region in the touch panel toward a second application displayed in the second region located lower than the first region in the touch panel.

Advantageous Effects of Invention

According to the invention, a user can operate a plurality of applications that are simultaneously displayed on a touch panel, using a hand holding a terminal.

BRIEF DESCRIPTION OF DRAWINGS

FIGS. 2A to 2C are diagrams illustrating the outline of a characteristic of the information processing apparatus according to Embodiment 1 of the present invention;

DESCRIPTION OF EMBODIMENTS

Embodiment 1

Hereinafter, Embodiment 1 of the present invention will be described in detail with reference to the accompanying drawings.

<Appearance of Information Processing Apparatus 100>

Figure 1:
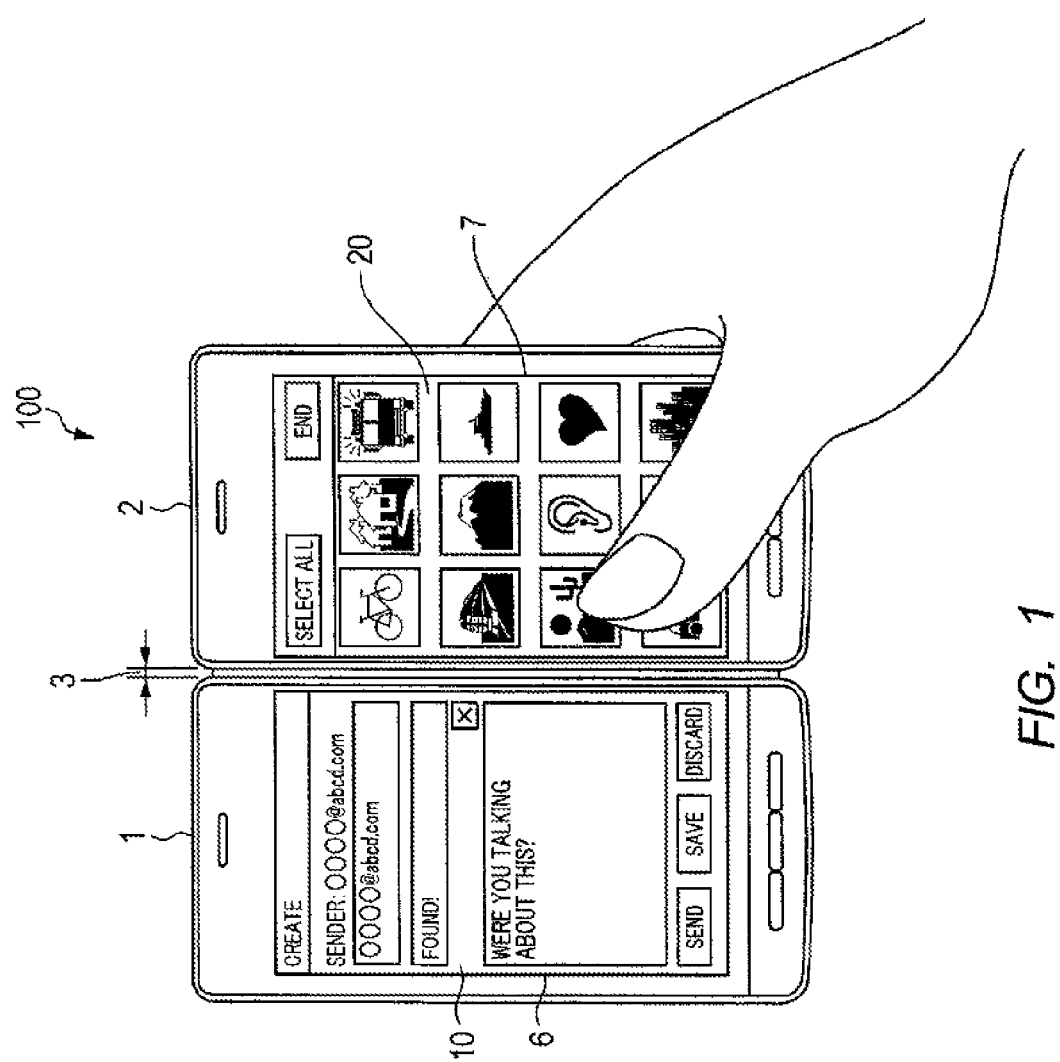
FIG. 1 is a diagram illustrating an example of an appearance of an information processing apparatus according to Embodiment 1 of the present invention.

FIG. 1 is a diagram illustrating an example of an appearance of information processing apparatus 100 according to the present embodiment. A smart phone or the like may be cited as an application target of information processing apparatus 100.

In FIG. 1, information processing apparatus 100 includes housing 1 and housing 2. Housing 1 and housing 2 have flat plate shapes, respectively. Further, housing 1 and housing 2 are connected to each other via hinge 3. Further, housing 1 includes touch panel 10, and housing 2 includes a touch panel 20.

In information processing apparatus 100, a user may perform an opening/closing operation to open or close housings 1 and 2 using hinge 3 as a shaft. By performing the opening/closing operation, the user may fold touch panels 10 and 20, or spread touch panels 10 and 20, as necessary. FIG. 1 illustrates the appearance in which touch panels 10 and 20 are in the spread state. In the spread state, the user may use two touch panels 10 and 20 as a single large screen touch panel.

In the spread state shown in FIG. 1, information processing apparatus 100 may display two applications at the same time. In FIG. 1, touch panel 10 displays application 6, and touch panel 20 displays application 7. Application 6 is a mail application for creation, transmission and reception of a mail, for example. Application 7 is a viewer application for reading image data, for example. Further, application 7 displays a plurality of image data thumbnails. Each thumbnail is an object capable of being moved to application 6 from application 7 by drag-and-drop. Here, the term "move" includes the meaning of copying image data.

Further, in the spread state of information processing apparatus 100, a mode in which two applications are displayed in a divided manner on the two touch panels, respectively, is referred to as a "two-application mode." On the other hand, in the spread state of information processing apparatus 100, a mode in which one application is displayed on the entirety of the two touch panels is referred to as a "full-screen mode." Information processing apparatus 100 is capable of switching between these modes.

In FIG. 1, the user holds housing 2 by the right hand. Here, the user can touch touch panel 20 by the thumb of the right hand and thus can operate application 7. On the other hand, the thumb of the right hand does not reach touch panel 10. For this reason, the user cannot operate application 6. In order to solve such a problem, information processing apparatus 100 has a characteristic to be described hereinafter. In the present embodiment, an example in which the operation is performed by the right hand is shown, but touch panel 10 may be operated by the left hand.

<Characteristic of Information Processing Apparatus 100>

The characteristic of information processing apparatus 100 will be described with reference to FIGS. 2A to 2C. FIGS. 2A to 2C are diagrams illustrating a transition example when information processing apparatus 100 is operated.

In FIG. 2A, the user holds housing 2 of information processing apparatus 100 in the spread state by the right hand. Touch panel 10 of housing 1 displays application 6, and touch panel 20 of housing 2 displays application 7. That is, the state shown in FIG. 2A is the same as the state shown in FIG. 1. In this state, the user tilts information processing apparatus 100 to operate application 6 using the thumb of the right finger.

In FIG. 2B, the user tilts housing 2 held by the right hand downward as indicated by arrow b. Thus, housing 1 is tilted upward as indicated by arrow a.

In FIG. 2C, information processing apparatus 100 that detects the tilt thereof slides (moves in parallel) application 6 displayed on touch panel 10 by a certain distance toward touch panel 20, and then stops application 6. As a result, as shown in FIG. 2C, application 6 is displayed on application 7 on touch panel 20. Thus, the user can operate application 6 by the thumb of the right hand.

The operation to display one of two applications that are simultaneously displayed, by moving the one of the two applications to the touch panel on which the other one of the two applications is displayed, as described above, is referred to as "slide display operation." Further, conversely, the operation in which the application that is under the slide display operation is moved to the original position and displayed is referred to as a "slide-return display operation." The slide display operation and slide-return display operations are examples of display control for application 6 or application 7.

In this way, in information processing apparatus 100 of the present embodiment, when the user operates application 6 displayed on touch panel 10 of housing 1 using the hand that holds housing 2, the user may performs an intuitive operation, which is only to tilt housing 2 downward. Thus, application 6 is slid from touch panel 10 of housing 1 and then displayed on touch panel 20 of housing 2. Accordingly, the user can operate application 6 by the finger of the hand that holds housing 2. That is, information processing apparatus 100 can solve the above-mentioned problem in that the user cannot operate application 6 that is not displayed in the vicinity of the hand that holds information processing apparatus 100 because the finger of the hand does not reach application 6. Accordingly, the user can operate a plurality of applications that are simultaneously displayed on the touch panels using the hand that holds the terminal.

<Configuration of Information Processing Apparatus 100>

Figure 3:
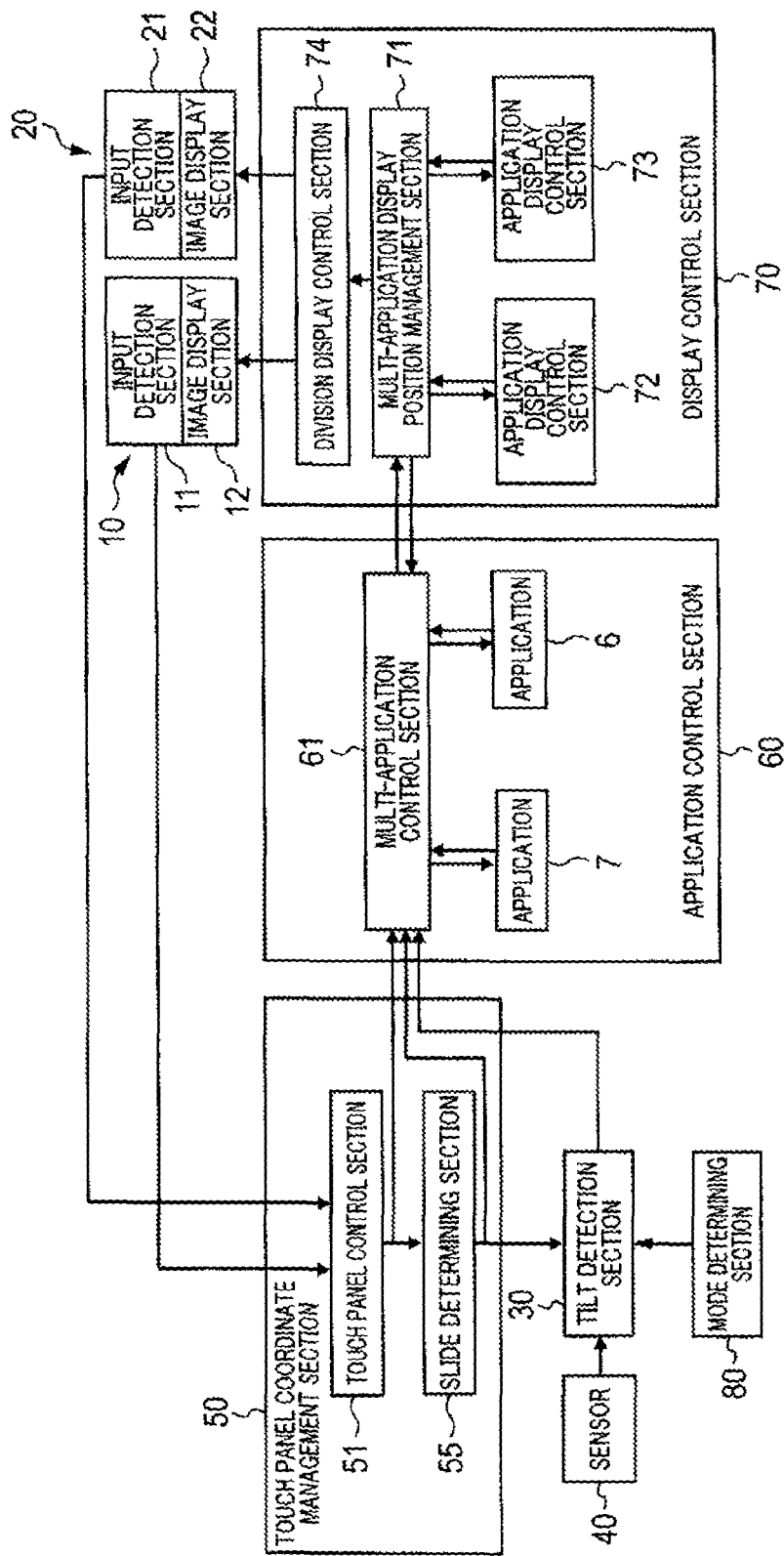
FIG. 3 is a block diagram illustrating an example of a configuration of the information processing apparatus according to Embodiment 1 of the present invention.

FIG. 3 is a block diagram illustrating an example of a configuration of information processing apparatus 100.

In FIG. 3, information processing apparatus 100 includes touch panel 10, touch panel 20, tilt detection section 30, sensor 40, touch panel coordinate management section 50, application control section 60, and display control section 70. Touch panels 10 and 20 are the same as those shown in FIG. 1 and FIGS. 2A to 2C. Further, mode determining section 80 is an optional configuration element, so that a description of the configuration element will be given hereinafter.

Touch panel 10 includes input detection section 11 and image display section 12.

Input detection section 11 detects a touch with respect to touch panel 10. Further, input detection section 11 outputs an X coordinate and a Y coordinate (hereinafter, referred to as "position information") of the touched position to touch panel control section 51 of touch panel coordinate management section 50. The user can touch panel 10 with a finger or a predetermined device (hereinafter, referred to as a "finger or the like").

Image display section 12 displays a screen or the like of an application on the basis of information input from division display control section 74. A liquid crystal display (LCD), an organic electro luminescence (EL) display or the like may be used as image display section 12, for example.

Touch panel 20 includes input detection section 21 and image display section 22. The sections have the same functions as in input detection section 11 and image display section 12 of touch panel 10. Accordingly, since the configuration of touch panel 10 is the same as the configuration of touch panel 20, a description of the configuration of touch panel 20 will be omitted.

Touch panel coordinate management section 50 includes touch panel control section 51 and slide determining section 55.

Touch panel control section 51 receives, as input, position information from each of input detection sections 11 and 21. Further, touch panel control section 51 generates operation information indicating the operation performed by the user on the basis of the input position information. Here, the operation refers to an operation performed by a user touching the touch panel, which includes a tap, double-tap, long-press, flick, drag, drop or the like, for example. Further, touch panel control section 51 outputs the operation information to slide determining section 55 and multi-application control section 61. In the present embodiment, a description will be given with an example in which the operation indicated by the operation information corresponds to an operation performed on the touch panel, but the present invention is not limited to this example. The operation indicated by the operation information may be an operation in which the user presses a physical switch that is provided separately from the touch panel, for example.

Slide determining section 55 determines whether an operation that enables the slide display operation on touch panel 10 or 20 (hereinafter, referred to as an "enabling operation") is performed on the basis of the operation information input from touch panel control section 51. Further, slide determining section 55 determines whether the slide display operation is enabled according to whether the enabling operation is performed. The enabling operation refers to a predetermined operation among operations performed by the user touching the touch panel, for example. The enabling operation may include a gesture operation, a virtual key pressing operation, object drag, virtual object drag, or the like, for example. The case of drag will be described in Embodiment 2 to be described later. Further, an example in which the enabling operation in the invention is an operation performed on a touch panel is described, but the present invention is not limited to this example. The enabling operation may be an operation in which the user presses a physical switch that is provided separately from the touch panel, for example.

Further, slide determining section 55 determines whether an operation that enables the slide display operation on touch panel 10 or 20 (hereinafter, referred to as a "disabling operation") is performed on the basis of the operation information input from touch panel control section 51. Further, slide determining section 55 may also determine whether the slide display operation is enabled according to whether the disabling operation is performed. The disabling operation refers to an operation performed by the user touching the touch panel, for example, similarly to the enabling operation. The disabling operation may include a gesture operation, a virtual key pressing operation, object drop, virtual object drop, or the like, for example. The case of drop will be described in Embodiment 2 to be described later.

Further, if it is determined that the slide display operation is enabled, slide determining section 55 sets a slide-display-operation enabled flag to ON. The slide-display-operation enabled flag is OFF by default. Further, slide determining section 55 outputs the slide-display-operation enabled flag set to ON to multi-application control section 61 and tilt detection section 30.

Further, if it is determined that the slide display operation is not enabled, slide determining section 55 sets the slide-display-operation enabled flag to OFF. Further, slide determining section 55 outputs the slide-display-operation enabled flag set to OFF to multi-application control section 61 and tilt detection section 30.

If the slide-display-operation enabled flag set to ON is input from slide determining section 55, tilt detection section 30 detects whether information processing apparatus 100 is tilted on the basis of the result of measurement performed by sensor 40. A gyro sensor or an acceleration sensor may be used as sensor 40. Sensor 40 outputs the measurement result thus obtained to tilt detection section 30.

Further, if it is detected that information processing apparatus 100 is tilted, tilt detection section 30 acts a tilt detection flag to ON. The tilt detection flag is OFF by default. Further, tilt detection section 30 generates tilt information indicating which one of housings 1 and 2 is positioned higher than the other on the basis of the measurement result of sensor 40. Further, tilt detection section 30 outputs the tilt detection flag set to ON and the generated tilt information to multi-application control section 61.

On the other hand, if it is not detected that information processing apparatus 100 is tilted, tilt detection section 30 sets the tilt detection flag to OFF. Further, tilt detection section 30 outputs the tilt detection flag set to OFF to multi-application control section 61.

Further, if the slide-display-operation enabled flag set to OFF is input from slide determining section 55, tilt detection section 30 does not detect whether information processing apparatus 100 is tilted, and sets the tilt detection flag to OFF. Further, tilt detection section 30 outputs the tilt detection flag set to OFF to multi-application control section 61.

Application control section 60 includes applications 6 and 7 and multi-application control section 61.

Applications 6 and 7 are the same as those shown in FIG. 1 and FIGS. 2A to 2C, respectively. Applications 6 and 7 may be a Home screen in which application icons are arranged, such as a standby screen in a smart phone or a tablet terminal, for example. Applications 6 and 7 perform input and output of a variety of information with respect to multi-application control section 61. The variety of information will be described later.

Multi-application control section 61 notifies application 6 or 7 of the operation information input from touch panel control section 51, and display position information input from display control section 70. Application 6 or 7 performs a predetermined process on the basis of the input information. Further, application 6 or 7 outputs process result information indicating the result of the process to multi-application control section 61. Multi-application control section 61 outputs a display instruction to multi-application display position management section 71 of display control section 70 on the basis of the input process result information.

Further, multi-application control section 61 determines a process to be executed on the basis of the slide-display-operation enabled flag input from slide determining section 55 and the tilt detection flag and the tilt information input from tilt detection section 30.

For example, when both of the slide-display-operation enabled flag and the tilt detection flag are set to ON, multi-application control section 61 determines that the slide display operation of application 6 or 7 is to be performed. Here, multi-application control section 61 determines which one of applications 6 and 7 is to be slid on the basis of the tilt information. That is, multi-application control section 61 determines an application that is being displayed on the touch panel of the housing positioned higher than the other, as a target of the slide display operation. Further, multi-application control section 61 outputs a display instruction for performing the slide display operation of application 6 or 7 (hereinafter, referred to as a "slide display operation instruction") to multi-application display position management section 71. Further, if it is determined to perform the slide display operation of application 6 or 7, multi-application control section 61 sets a slide-display-operation execution flag included therein to ON. When the slide-display-operation execution flag is set to ON, this means that execution of the slide display operation is determined. The slide-display-operation execution flag is set to OFF by default.

The slide display operation refers to the operation in which, when two applications are respectively displayed on two touch panels, one of the applications is slid and displayed on the touch panel on which the other application is displayed, as described in FIGS. 2A to 2C. Here, the slide display operation may be referred to as a "first display control."

Further, for example, when the slide-display-operation enabled flag is set to ON and the tilt detection flag is set to OFF, multi-application control section 61 determines to keep the current display states of applications 6 and 7. Further, multi-application control section 61 outputs a display instruction to keep the display state of application 6 or 7 (hereinafter, referred to as a "display state keeping instruction") to multi-application display position management section 71. The term "keeping the display state" means that the state in which the application is under the slide display operation as shown in FIG. 2C is kept when the display state is after execution of the slide display operation, and moans that the default-display state shown in FIG. 2A is kept when the display state is before execution of the slide display operation.

Further, for example, when the slide-display-operation enabled flag is set to OFF, multi-application control section 61 performs any one of the following operations. Here, when the slide-display-operation enabled flag is set to OFF, the tilt detection flag is set to OFF.

If the slide-display-operation enabled flag is set to OFF from the beginning, multi-application control section 61 controls applications 6 and 7 to perform a normal process. That is, as described above, multi-application control section 61 notifies application 6 or 7 of the position information. Application 6 or 7 specifies a process to be executed on the basis of the notified position information. Further, application 6 or 7 executes the specified process. Then, application 6 or 7 outputs process result information indicating the result of the executed process to multi-application control section 61. If the process result information is input from application 6 or 7, multi-application control section 61 outputs a display instruction based on the information to multi-application display position management section 71.

When the slide-display-operation enabled flag is changed to OFF from ON, multi-application control section 61 determines whether the slide display operation is executed on the basis of the slide-display-operation execution flag. For example, when the slide-display-operation execution flag is set to ON, multi-application control section 61 determines that the slide display operation is executed.

If it is determined that the slide display operation is executed, multi-application control section 61 outputs a display instruction to perform the slide-return display operation (hereinafter, referred to as a "slide-return display operation instruction") to multi-application display position management section 71. Here, as described above, the slide-return display operation refers to the operation to return the display position of the slid application to the original display position, when the slide display operation is performed. Here, the slide-return display operation may be referred to as a "second display control."

Display control section 70 includes multi-application display position management section 71, application display control sections 72 and 73, and division display control section 74.

If the display instruction is input from multi-application control section 61, multi-application display position management section 71 controls application display control sections 72 and 73 and division display control section 74, and controls screen displays of touch panels 10 and 20. The control is described as follows.

Multi-application display position management section 71 outputs the display instruction input from multi-application control section 61 to application display control section 72 or 73. Here, the display instruction corresponds to a slide display operation instruction, a display state keeping instruction or a slide-return display operation instruction. Then, if the display position information is received from application display control section 72 or 73, multi-application display position management section 71 updates display position information that is retained therein to the received display position information. Further, multi-application display position management section 71 outputs the updated display position information to multi-application control section 61. The display position information refers to information indicating the positions of touch panels 10 and 20 where applications 6 and 7 are respectively displayed. In the display position information, the display position of each application is defined by an X coordinate and a Y coordinate. Here, the X coordinate and the Y coordinate refer to coordinates when touch panels 10 and 20 are used as a single screen.

The positions of applications 6 and 7 displayed by default (hereinafter, referred to as "default display positions") are previously determined, respectively. The default display positions of respective applications 6 and 7 are different from each other. For example, the positions where applications 6 and 7 are shown in FIG. 1 and FIG. 2A correspond to the default display positions, respectively.

Further, the display positions of applications 6 and 7 obtained as the result of the slide display operation (hereinafter, referred to as "slide-display-operation positions") are also previously determined. The slide-display-operation positions of respective applications 6 and 7 are different from each other. For example, a position where application 6 shown in FIG. 2C corresponds to a slide-display-operation position of application 6. That is, the slide-display-operation position of application 6 is the same as the default display position of application 7. On the other hand, in FIG. 2A, the position where application 6 is displayed corresponds to the slide-display-operation position of application 7. That is, the slide-display-operation position of application 7 is the same as the default display position of application 6.

Application display control section 72 includes display position information indicating the default display position of application 7 and display position information indicating the slide-display-operation position of application 7, respectively. Further, application display control section 73 includes display position information indicating the default display position of application 6 and display position information indicating the slide-display-operation position of application 6, respectively.

Further, multi-application display position management section 71 generates full-screen display information on the basis of the updated display position information, and outputs the result to division display control section 74. Here, the full-screen display information corresponds to image data displayed on touch panels 10 and 20.

Application display control section 72 changes display position information on application 7 that is retained therein on the basis of the display instruction input from multi-application display position management section 71. Application display control section 73 changes display position information on application 6 that is retained therein on the basis of the display instruction input from multi-application display position management section 71. For example, upon reception of the slide display operation instruction for application 6, application display control section 73 changes display position information indicating the default display position to display position information indicating the slide-display-operation position. On the other hand, upon reception of the slide-return display operation instruction for application 6, application display control section 73 changes the display position information indicating the slide-display-operation position to the display position information indicating the default display position. Upon reception of the display state keeping instruction for application 7, application display control section 73 does not change the display position information on application 7 that is retained therein. The operation of application display control section 72 is the same as in application display control section 73. In this way, if the change of the display position information is completed, application display control sections 72 and 73 output the changed display position information to multi-application display position management section 71.

Division display control section 74 performs a control so that image data indicated by the full-screen display information input from multi-application display position management section 71 is displayed in a divided manner on touch panels 10 and 20. That is, division display control section 74 divides the image data indicated by the full-screen display information and outputs the result to image display sections 12 and 22.

Although not shown, information processing apparatus 100 includes a central processing unit (CPU), a recording medium such as a read only memory (ROM) that stores a control program, and a working memory such as a random access memory (RAM). In this case, the above-mentioned functions of the sections are realized by executing the control program by the CPU.

Information processing apparatus 100 performs the following operations so that the user operates application 6 displayed on touch panel 10 by the right hand that holds housing 2. First, the user tilts housing 1 upward and housing 2 downward in such a way that housing 1 is positioned higher than housing 2 in a state where the enabling operation to enable the slide display operation is performed.

Then, slide determining section 55 determines that the slide display operation is enabled on the basis of execution of the enabling operation, and sets the slide-display-operation enabled flag to ON. Then, tilt detection section 30 detects the tilt of information processing apparatus 100 on the basis of the measurement result of sensor 40, sets the tilt detection flag to ON, and generates the tilt information. Multi-application control section 61 determines whether to perform the slide display operation, as being triggered when the slide-display-operation enabled flag and the tilt detection flag are all set to ON. Specifically, when the slide-display-operation enabled flag and the tilt detection flag are all set to ON, multi-application control section 61 determines that application 6 displayed on touch panel 10 is slid toward touch panel 20 and displayed thereon on the basis of the tilt information. Then, multi-application display position management section 71 controls application display control section 73 and division display control section 74 to execute the slide display operation of application 6. In this way, application 6 is slid toward touch panel 20 and displayed thereon. As a result, as shown in FIG. 2C, application 6 is displayed on application 7 on touch panel 20. Thus, the user can operate application 6 using the thumb of the right hand that holds housing 2.

That is, according to information processing apparatus 100, when the user wants to operate application 6 displayed on touch panel 10 that the finger of the hand holding housing 2 does not reach, the user may perform an intuitive operation, which is only to tilt housing 2 held by the hand, downward. Thus, application 6 is slid from touch panel 10 of housing 1 toward touch panel 20 of housing 2 and displayed thereon. Accordingly, the user can operate application 6 by the finger of the hand that holds housing 2. That is, information processing apparatus 100 can solve the above-mentioned problem in that the user cannot operate application 6 that is not displayed in the vicinity of the hand that holds information processing apparatus 100 because the finger of the hand does not reach application 6. Accordingly, the user can operate a plurality of applications that are simultaneously displayed on the touch panels using the hand that holds the terminal.

<Operation of Information Processing Apparatus 100>

Figure 4:
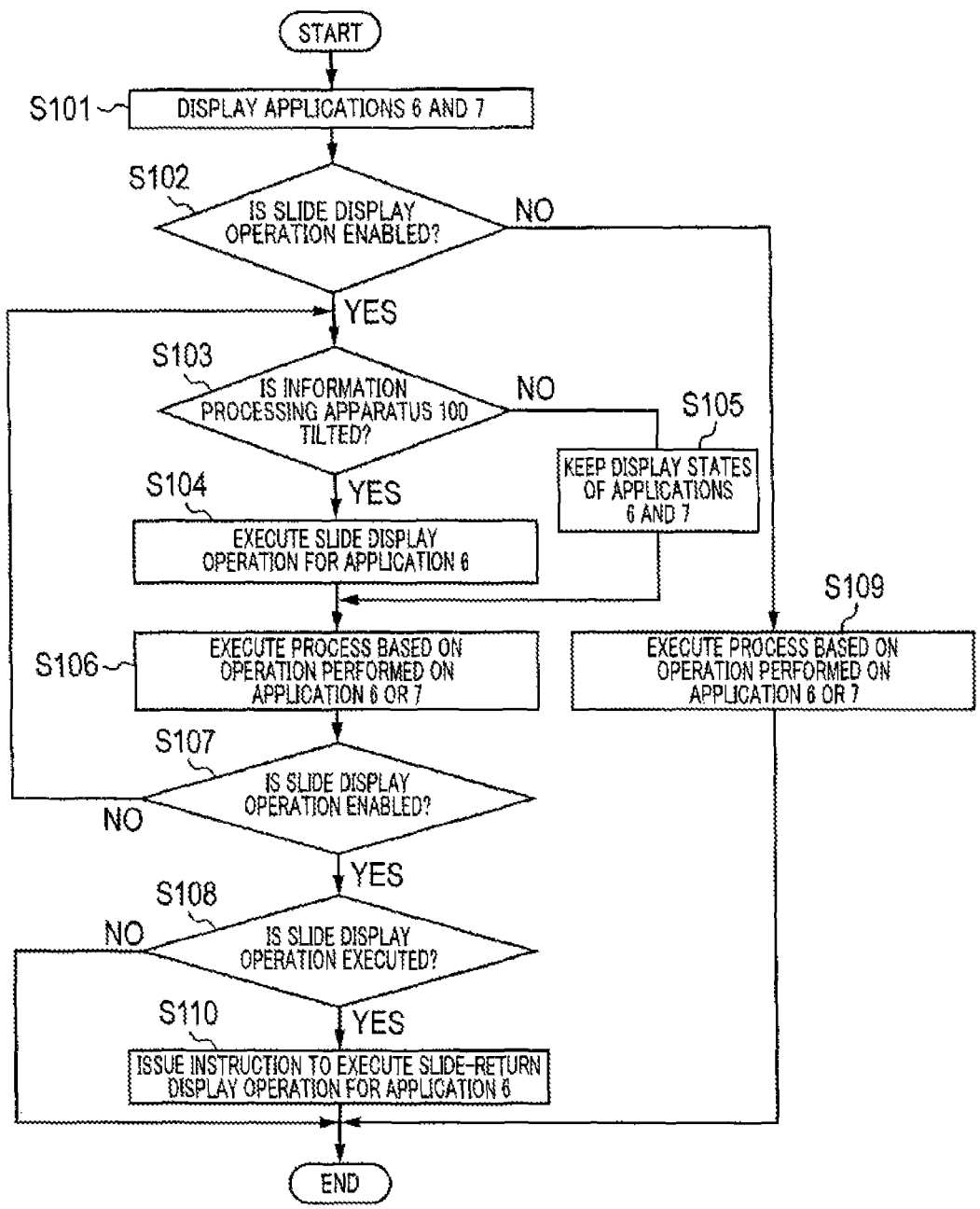
FIG. 4 is a flowchart illustrating an example of an operation of the information processing apparatus according to Embodiment 1 of the present invention.

FIG. 4 is a flowchart illustrating an example of an operation of information processing apparatus 100. Hereinafter, a case where a user operates touch panel 20 by the thumb of the right hand while holding housing 2 by the right hand will be described as an example.

In step S101, touch panel 10 displays application 6, and touch panel 20 displays application 7, as shown in FIG. 1 and FIG. 2A. Here, if the user performs the enabling operation on touch panel 20, input detection section 21 outputs position information to touch panel control section 51 and multi-application control section 61. Further, if the position information is obtained from input detection section 21, information touch panel control section 51 generates operation information indicating an operation performed by the user. Further, touch panel control section 51 outputs the generated operation information to slide determining section 55 and multi-application control section 61.

In step S102, slide determining section 55 determines whether the enabling operation is performed on touch panel 10 or 20 on the basis of the input operation information. Further, slide determining section 55 determines whether the slide display operation is enabled according to whether the enabling operation is performed.

As a result of determination, if it is determined that the slide display operation is enabled (YES in S102), slide determining section 55 sets the slide-display-operation enabled flag to ON. Further, slide determining section 55 outputs the slide-display-operation enabled flag (ON) to multi-application control section 61 and tilt detection section 30. Further, the procedure proceeds to step S103.

On the other hand, as a result of determination, if it is determined that the slide display operation is not enabled (NO in step S102), slide determining section 55 sets the slide-display-operation enabled flag to OFF. Further, slide determining section 55 outputs the slide-display-operation enabled flag (OFF) to multi-application control section 61 and tilt detection section 30. If the slide-display-operation enabled flag (OFF) is input from slide determining section 55, tilt detection section 30 sets the tilt detection flag to OFF. Further, tilt detection section 30 outputs the tilt detection flag (OFF) to multi-application control section 61. Further, the procedure proceeds to step S109.

In step S109, multi-application control section 61 determines that a normal process is to be performed on the basis of the fact that the slide-display-operation enabled flag is set to OFF from the beginning. Further, multi-application control section 61 causes application 6 or 7 to execute a predetermined process on the basis of operation information indicating an operation performed in application 6 or 7. That is, multi-application control section 61 outputs the operation information input from touch panel control section 51 to application 6 or 7. Further, application 6 or 7 specifies a process to be executed on the basis of the operation information. Further, if the specified process is executed, application 6 or 7 outputs process result information indicating the process result to multi-application control section 61. If the process result information is input from application 6 or 7, multi-application control section 61 outputs a display instruction based on the process result information to multi-application display position management section 71. Then, multi-application display position management section 71 controls division display control section 74 and performs a display operation on touch panel 10 or 20, as described above. Here, the display operation performed is different from the slide display operation and the slide-return display operation, and is a normal display operation in which the processing result in the application is reflected.

In step S103, if the slide-display-operation enabled flag (ON) is input from slide determining section 55, tilt detection section 30 receives, as input, the result of measurement performed by sensor 40 from sensor 40. Further, tilt detection section 30 detects whether information processing apparatus 100 is tilted on the basis of the measurement result of sensor 40.

As a result of detection, if it is detected that information processing apparatus 100 is tilted (YES in S103), tilt detection section 30 sets the tilt detection flag to ON. Further, tilt detection section 30 generates tilt information indicating which one of housing 1 and housing 2 is positioned higher than the other, on the basis of the measurement result of sensor 40. Here, it is assumed that tilt information indicating that housing 1 is positioned higher than housing 2 is generated, for example. Further, tilt detection section 30 outputs the tilt detection flag (ON) and the tilt information to multi-application control section 61. Further, the procedure proceeds to step S104.

On the other hand, if it is not detected that information processing apparatus 100 is tilted (NO in S103), tilt detection section 30 sets the tilt detection flag to OFF. Further, tilt detection section 30 outputs the tilt detection flag (OFF) to multi-application control section 61. Further, the procedure proceeds to step S105.

In step S104, multi-application control section 61 and multi-application display position management section 71 execute the slide display operation of application 6. The procedure of this operation is as follows.

First, multi-application control section 61 determines that the slide display operation of application 6 or 7 is to be performed on the basis that both of the slide-display-operation enabled flag and the tilt detection flag are set to ON. Further, multi-application control section 61 determines which one of application 6 and application 7 is to be slid on the basis of the tilt information. For example, if the tilt information indicates that housing 1 is positioned higher than housing 2, multi-application control section 61 determines application 6 that is being displayed on touch panel 10 of housing 1 positioned higher as a target of the slide display operation. Further, multi-application control section 61 outputs a slide display operation instruction for application 6 to multi-application display position management section 71. Further, multi-application display position management section 71 controls application display control section 73 and division display control section 74 on the basis of the slide display operation instruction for application 6, as described above. Application display control section 73 changes the display position information on application 6 from a default display position to a slide-display-operation position. Further, multi-application display position management section 71 generates full-screen display information on the basis of the changed display position information, and outputs the result to division display control section 74. Division display control section 74 displays an image in a divided manner on touch panels 10 and 20 on the basis of the full-screen display information. In this way, division display control section 74 slides application 6 from touch panel 10 to touch panel 20, and displays application 6 on the position where application 7 is displayed.

Further, if it is determined that the slide display operation of application 6 or 7 is performed, multi-application control section 61 sets the slide-display-operation execution flag that is retained therein to ON.

If the procedure reaches step S104 in a state where the slide display operation of application 6 is already executed, multi-application control section 61 and multi-application display position management section 71 keep the slide display operation of application 6 that is already being executed.

In step S105, multi-application control section 61 and multi-application display position management section 71 execute to keep the display states of applications 6 and 7. The procedure is as follows.

First, multi-application control section 61 determines that the display states of applications 6 and 7 are to be kept on the basis that the slide-display-operation enabled flag is set to ON and the tilt detection flag is set to OFF. Further, multi-application control section 61 outputs a display state keeping instruction to multi-application display position management section 71. Multi-application display position management section 71 controls application display control sections 72 and 73 and division display control section 74 on the basis of the display state keeping instruction, as described above. Application display control section 72 does not change the display position information on application 7, and application display control section 73 does not change either the display position information on application 6. Further, multi-application display position management section 71 generates full-screen display information on the basis of the display position information that is retained therein, and outputs the result to division display control section 74. Division display control section 74 displays an image in a divided manner on touch panels 10 and 20 on the basis of the full-screen display information. In this way, multi-application display position management section 71 keeps the display state where the slide display operation of application 6 is performed (for example, see FIG. 2C) on touch panels 10 and 20. Alternatively, multi-application display position management section 71 keeps the display state before the slide display operation of application 6 is performed (for example, see FIG. 2A).

In step S106, multi-application control section 61 executes a predetermined process on the basis of the operation performed on application 6 or 7. That is, multi-application control section 61 outputs the position information input from touch panel control section 51 to application 6 or 7 to execute the process. Further, if process result information is input from application 6 or 7, multi-application control section 61 outputs a display instruction based on the process result information to multi-application display position management section 71. Then, multi-application display position management section 71 controls division display control section 74, and performs display on touch panel 10 or 20, as described above. The display performed herein is different from the slide display operation and the slide-return display operation, and is a normal display in which the process result in the application is reflected.

In step S107, slide determining section 55 determines whether the disabling operation is performed on touch panel 10 or 20 on the basis of input operation information again.

Further, slide determining section 55 determines whether the slide display operation is enabled according to whether the disabling operation is performed.

As a result of determination, if it is determined that the slide display operation is enabled (YES in S107), slide determining section 55 sets the slide-display-operation enabled flag to ON. Further, slide determining section 55 outputs the slide-display-operation enabled flag (ON) to multi-application control section 61 and tilt detection section 30. Further, the procedure returns to step S103.

On the other hand, if it is determined that the slide display operation is not enabled (NO in S107), slide determining section 55 sets the slide-display-operation enabled flag to OFF. Here, slide determining section 55 assigns flag information indicating the change from ON to OFF to the slide-display-operation enabled flag (OFF), for example. Further, slide determining section 55 outputs the slide-display-operation enabled flag (OFF) to multi-application control section 61 and tilt detection section 30. If the slide-display-operation enabled flag (OFF) is input from slide determining section 55, tilt detection section 30 sets the tilt detection flag to OFF. Further, tilt detection section 30 outputs the tilt detection flag (OFF) to multi-application control section 61. Further, the procedure proceeds to step S108.

In step S108, multi-application control section 61 determines whether the slide display operation is performed on the basis of the slide-display-operation execution flag.

As a result of determination, if the slide-display-operation execution flag is set to ON (YES in S108), multi-application control section 61 determines that the slide display operation is executed. Further, the procedure proceeds to step S110.

On the other hand, as a result of determination, if the slide-display-operation execution flag is set to OFF (NO in S108), multi-application control section 61 determines that the slide display operation is not executed. The procedure is thus finished.

In step S110, multi-application control section 61 and multi-application display position management section 71 execute the slide-return display operation of application 6. The procedure of this operation is as follows.

First, multi-application control section 61 determines that the slide-return display operation of application 6 is to be performed on the basis that the slide-display-operation enabled flag is set to OFF and the flag information is assigned. Further, multi-application control section 61 outputs a slide-return display operation instruction for application 6 to multi-application display position management section 71. Multi-application display position management section 71 controls application display control section 73 and division display control section 74 on the basis of the slide-return display operation instruction for application 6, as described above. Application display control section 73 changes the display position information on application 6 to the default display position from the slide-display-operation position. Further, multi-application display position management section 71 generates full-screen display information on the basis of the changed display position information, and outputs the result to division display control section 74. Division display control section 74 divides and displays an image on touch panels 10 and 20 on the basis of the full-screen display information. In this way, in division display control section 74, application 6 is slid from touch panel 20 to touch panel 10 and displayed at the original position. Accordingly, application 7 is displayed again on touch panel 20. Hence, the procedure is finished.

According to the operation of information processing apparatus 100 described above, when the user wants to operate application 6 displayed on touch panel 10 that the finger of the hand holding housing 2 does not reach, the user may perform an intuitive operation, which is only to tilt housing 2 held by the hand, downward. Thus, application 6 is slid from touch panel 10 of housing 1 to touch panel 20 of housing 2 and displayed thereon. Accordingly, the user can operate application 6 by the finger of the hand that holds housing 2. That is, information processing apparatus 100 can solve the above-mentioned problem in that the user cannot operate application 6 that is not displayed in the vicinity of the hand that holds information processing apparatus 100 because the finger of the hand does not reach application 6. Accordingly, the user can operate a plurality of applications that are simultaneously displayed on the touch panels using the hand that holds the terminal.

Further, according to the operation of information processing apparatus 100, after the slide display operation of application 6 is executed, the state of the slide display operation is kept until the disabling operation is performed. That is, even though the user tilts information processing apparatus 100 to perform the slide display operation and then returns the tilt, the slide display operation is kept as the current display state. Accordingly, the user does not have to operate application 6 that is under the slide display operation in a state where information processing apparatus 100 is tilted.

Variations of Embodiment 1

Hereinbefore, the present embodiment has been described, but the description is only an example, and various modifications are possible. Hereinafter, variations will be described.

In the above description, in the slide display operation of application 6, application 6 completely moves to touch panel 20 and is displayed while being superimposed on the entirety of application 7, but the form of the slide display operation is not limited to this case. For example, application 6 may be displayed while being superimposed on part of application 7 over touch panels 10 and 20. Thus, the user can operate both of applications 6 and 7.

In the above description, the slide display operation is performed on the premise of execution of the enabling operation and the slide-return display operation is performed on the premise of execution of the disabling operation, but these operations may be executed without such premises. That is, in FIG. 3, in the present embodiment, slide determining section 55 may be omitted. In this case, when information processing apparatus 100 is tilted, tilt detection section 30 sets the tilt detection flag to ON, and generates tilt information. Meanwhile, when the state returns to the original state from the tilted state of information processing apparatus 100, tilt detection section 30 sets the tilt detection flag to OFF. Further, when the tilt detection flag is set to ON, multi-application control section 61 determines that the slide display operation is to be executed on the basis of the tilt information. On the other hand, when the tilt detection flag is set to OFF, multi-application control section 61 determines that the slide-return display operation is to be executed. Thus, the user can perform the slide display operation if information processing apparatus 100 is tilted, and can perform the slide-return display operation if the tilt of information processing apparatus 100 returns to the original state, without performing the enabling operation and the disabling operation.

Although a case has been described above as an example, where application 6 is slid and displayed while two applications 6 and 7 are in operation in information processing apparatus 100, the slide display operation is not limited to this case. For example, even while three or more applications are in operation in information processing apparatus 100, information processing apparatus 100 may perform the slide display operation. In this case, it is assumed that an application other than applications 6 and 7 is not displayed on any one of touch panels 10 and 20. Here, when the user wants to operate the application other than application 6, the user waits for a predetermined time with housing 2 held by the right hand being tilted downward. Thus, information processing apparatus 100 first slides and displays application 6 displayed on touch panel 10 as described above. Then, information processing apparatus 100 displays the third application that is hidden under the application 6 being displayed on touch panel 10, and performs the slide display operation, similarly to application 6. Here, information processing apparatus 100 displays the third application on application 6 that is slid first. When still another application is in operation, information processing apparatus 100 repeats the same operation as the operation for the third application. In this way, when three or more applications are in operation, information processing apparatus 100 automatically switches the applications to be displayed, one by one, and performs the slide display operation like page turning. Accordingly, the user may only wait with housing 2 held by one hand being tilted until a desired application is slid and displayed. That is, when a plurality of applications are in operation, the user can find and operate a desired application that is in operation but not displayed, by only performing an intuitive operation while holding information processing apparatus 100 by one hand.

In the above description, the tilt information assigned to the tilt detection flag indicates which one of housings 1 and 2 is positioned higher than the other, but the content of the tilt information is not limited thereto. For example, tilt detection section 30 may add the size of the tilt angle of information processing apparatus 100 to the tilt information in addition to the content. In this case, multi-application control section 61 changes the sliding speed according to the size of the angle. For example, the larger the size of the angle is, the more multi-application control section 61 will increase the speed at which application 6 is slid and displayed. Thus, the user can optionally change the speed at which the application is slid and displayed by changing the tilt angle of information processing apparatus 100.

In the above description, an example in which mode determining section 80 shown in FIG. 3 is not used has been described, but an example in which mode determining section 80 is used will be described herein. Mode determining section 80 determines whether information processing apparatus 100 is in the full-screen mode or the two-application mode. The full-screen mode refers to a mode in which one application is displayed, using both of touch panels 10 and 20 in combination as a single screen. On the other hand, the two-application mode refers to a mode in which one application is displayed, using each of touch panels 10 and 20 as a single screen. FIG. 1 and FIG. 2A show the two-application mode. As a result of determination, in the case of the two-application mode, mode determining section 80 sets a mode determination flag to ON, and in the case of the full-screen mode, mode determining section 80 sets the mode determination flag to OFF. Further, mode determining section 80 outputs the mode determination flag to tilt detection section 30. Mode determining section 80 executes the output of the mode determination flag before step S103 shown in FIG. 4. When both of the slide-display-operation enabled flag input from slide determining section 55 and the mode determination flag input from mode determining section 80 are set to ON, tilt detection section 30 detects whether information processing apparatus 100 is tilted. In this way, by using mode determining section 80, it is possible to operate tilt detection section 30 only in the two-application mode.

In the above description, an example in which information processing apparatus 100 includes two touch panels 10 and 20 has been described, but the number of touch panels is not limited. The number of touch panels may be one, or three or more.

In the above description, an example in which applications 6 and 7 are displayed horizontally in a row has been described, but the form of displaying an application is not limited thereto. For example, the present invention may also be applied to a case where applications 6 and 7 are displayed vertically in a row.

In the above description, an example in which application 6 is slid toward application 7 has been described, but the form of movement of application 6 is not limited to this example. Instead of the slide display operation, the present invention may be applied to a display method in which application 6 is deleted once from touch panel 10 and appears on application 7 to be displayed on touch panel 20, for example.

The operation of information processing apparatus 100 may be realized by software in cooperation with hardware.

Embodiment 2

Next, Embodiment 2 of the invention will be described. The present embodiment is different from Embodiment 1 in that touch panel coordinate management section 50 includes drag and drop determining section 52 as an example of slide determining section 55.

<Appearance of Information Processing Apparatus 101>

The appearance of information processing apparatus 101 is the same as the appearance of information processing apparatus 100 shown in FIG. 1. Accordingly, detailed description thereof will be omitted. Further, a smart phone or the like may be cited as an application target of information processing apparatus 101.

<Outline of Characteristic of Information Processing Apparatus 101>

A characteristic of information processing apparatus 101 will be described with reference to FIGS. 5A to 5C. Hereinafter, for example, in the state of FIG. 1, a case where the user drags and drops an object of application 7 to application 6 using the right hand that holds housing 2 will be described. FIGS. 5A, 5B and 5C are diagrams illustrating a transition example when information processing apparatus 100 is operated.

In FIG. 5A, the user holds housing 2 of information processing apparatus 100 in a spread state by the right hand. Touch panel 10 of housing 1 displays application 6, and touch panel 20 of housing 2 displays application 7. That is, the state shown in FIG. 5A is the same as shown in FIG. 1. In this state, the user selects object 4 from a plurality of objects of application 7 using the thumb of the right hand, and drags object 4 on touch panel 20 by a predetermined distance. Further, the user tilts information processing apparatus 101 with object 4 being dragged.

In FIG. 5B, the user tilts housing 2 held by the right hand downward as indicated by arrow b. Thus, housing 1 is tilted upward as indicated by arrow a.

In FIG. 5C, information processing apparatus 101 that detects the tilt thereof slides (moves in parallel) application 6 displayed on touch panel 10 by a certain distance toward touch panel 20, and stops sliding the application. As a result, as shown in FIG. 5C, application 6 is displayed on touch panel 20. Here, application 6 is displayed under object 4 while being dragged and above application 7. In this state, the user drops object 4. Thus, the user completes the drag and drop of object 4 from application 7 to application 6.

As described above, in information processing apparatus 101 of the present embodiment, the user drags object 4 using the hand that holds housing 2. Further, when the user drops application 6 displayed on touch panel 10 of housing 1, the user may perform an intuitive operation, which is only to tilt housing 2 downward with object 4 being dragged on touch panel 10. Thus, application 6 being displayed is slid and displayed on touch panel 20, and thus, the user can drop object 4 to application 6 without dragging the selected object 4 up to touch panel 10. That is, information processing apparatus 101 can solve the above-mentioned problem in that the user cannot drag and drop application 6 that is not displayed in the vicinity of the hand that holds information processing apparatus 101 because the finger of the hand does not reach application 6.

Figure 5:
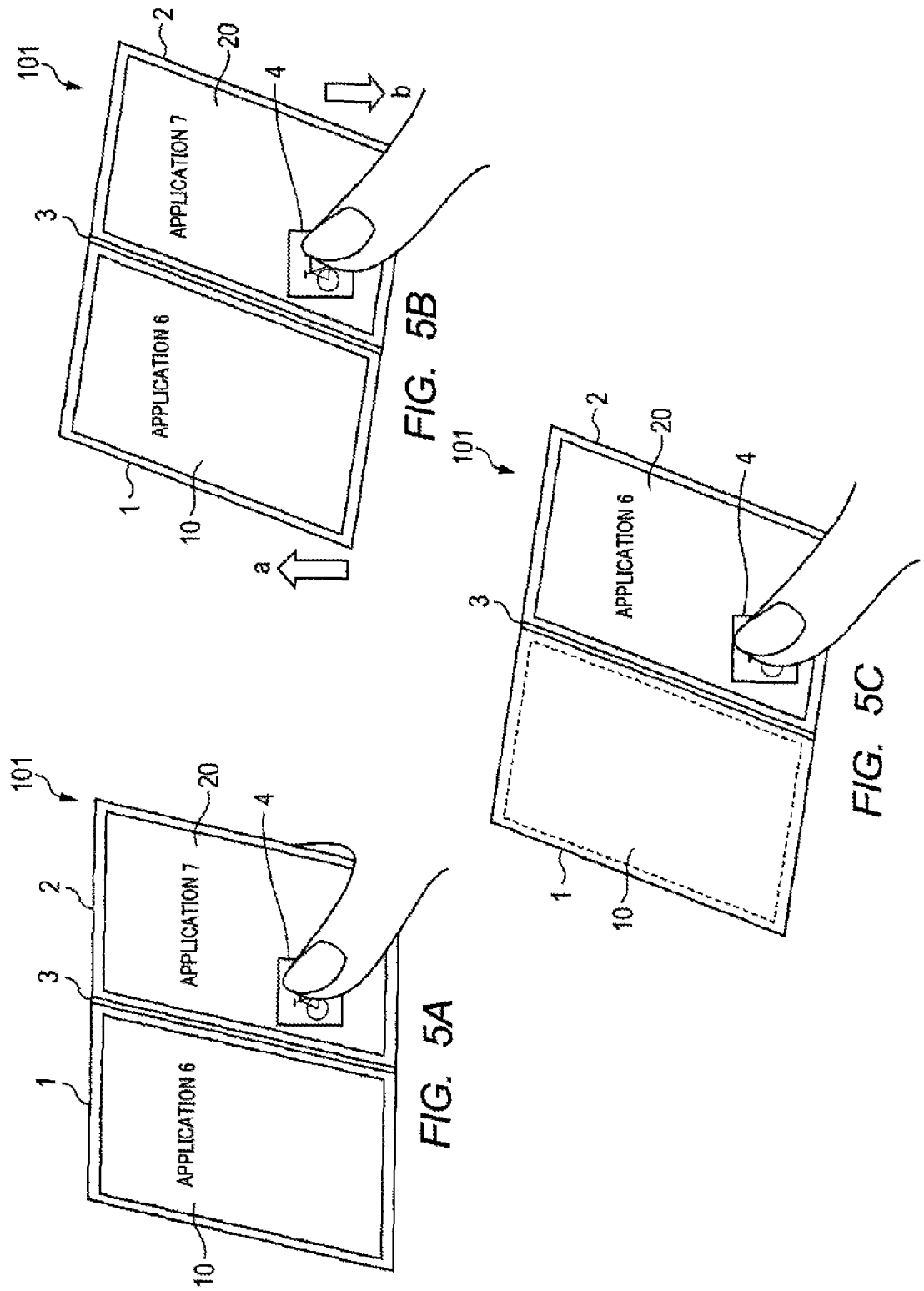
FIGS. 5A to 5C are diagrams illustrating the outline of a characteristic of an information processing apparatus according to Embodiment 2 of the present invention.

In FIGS. 1 and 5, even though the finger of the hand that holds housing 2 reaches touch panel 10, the following problems occur. In FIGS. 1 and 5, a space between touch panels 10 and 20 is discontinuous because some part of housings 1 and 2 is present therebetween. Accordingly, when the dragging finger is in contact with the part of housing 2 while the user selects and drags object 4 from application 7, the finger is separated from touch panel 20, and thus, the user cannot drop object 4 to application 6. However, as described above, in information processing apparatus 101, the user has only to perform an intuitive operation, which is only to tilt housing 2 downward. Thus, since the display of application 6 is slid and displayed on touch panel 20, the user can drop object 4 to application 6 without dragging the selected object 4 up to touch panel 10. That is, information processing apparatus 101 can solve the above-mentioned problem in that the operation error easily occurs due to the discontinuity between the touch panels.

<Configuration of Information Processing Apparatus 101>

Figure 6:
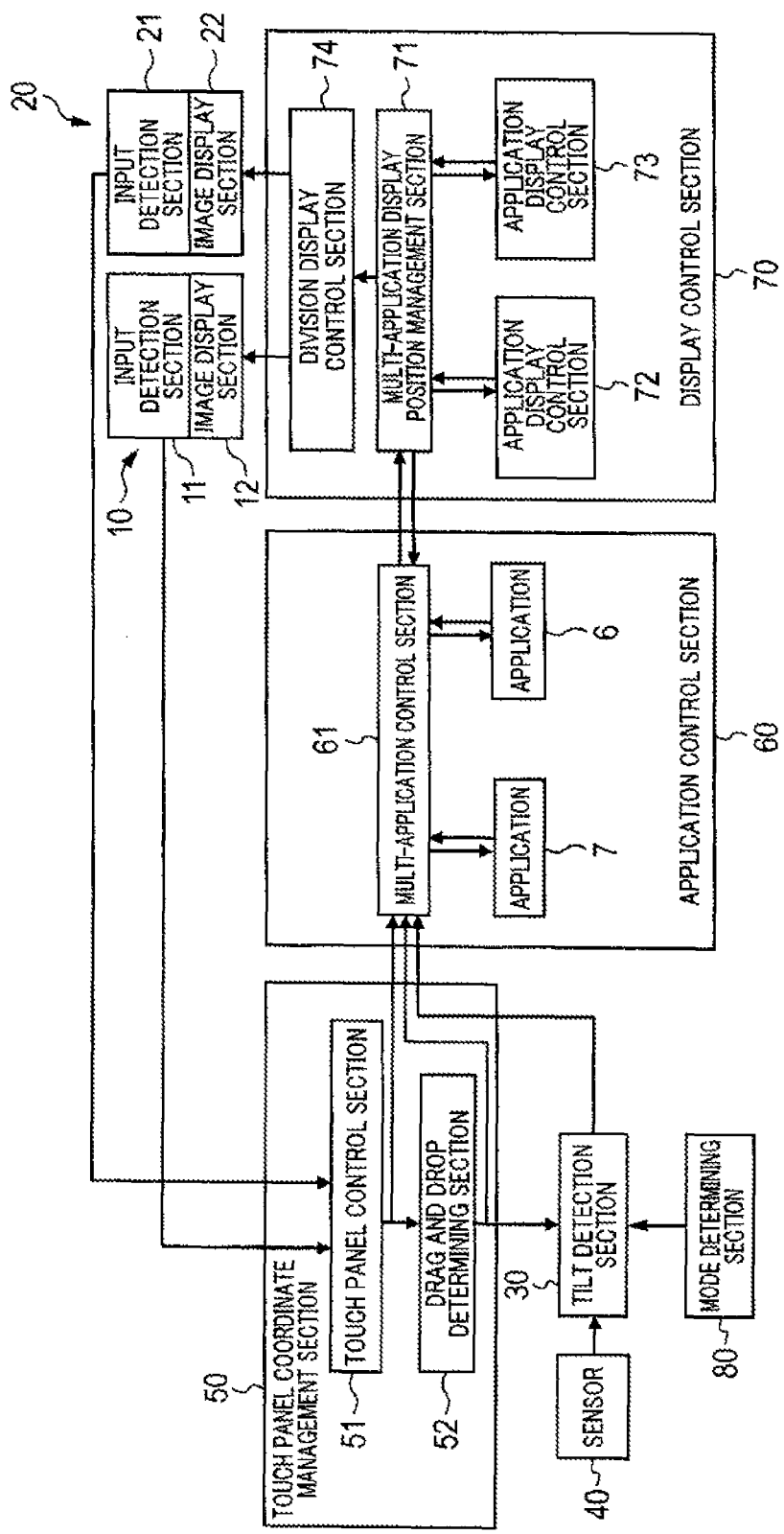
FIG. 6 is a block diagram illustrating an example of a configuration of the information processing apparatus according to Embodiment 2 of the present invention.

FIG. 6 is a block diagram illustrating an example of a configuration of information processing apparatus 101. In FIG. 6, since the sections other than drag and drop determining section 52 are already described in Embodiment 1 with reference to FIG. 3, description thereof will be omitted.

Drag and drop determining section 52 determines whether drag or drop is performed on the basis of operation information input from touch panel control section 51. Further, drag and drop determining section 52 determines whether the slide display operation is enabled according to whether the drag or drop is performed. That is, in the present embodiment, the drag is an example of the enabling operation and the drop is an example of the disabling operation.

Further, if it is determined that the drag is performed, drag and drop determining section 52 sets the slide-display-operation enabled flag to ON. Further, drag and drop determining section 52 outputs the slide-display-operation enabled flag set to ON to multi-application control section 61 and tilt detection section 30.

On the other hand, if it is determined that the drop is performed, drag and drop determining section 52 sets the slide-display-operation enabled flag to OFF. Further, drag and drop determining section 52 outputs the slide-display-operation enabled flag set to OFF to multi-application control section 61 and tilt detection section 30.

According to information processing apparatus 101 described above, first, when object 4 of application 7 is dragged on touch panel 20, drag and drop determining section 52 sets the slide-display-operation enabled flag to ON. Then, when it is detected that information processing apparatus 101 is tilted, tilt detection section 30 sets the tilt detection flag to ON. Then, when the slide-display-operation enabled flag and the tilt detection flag are all set to ON, multi-application control section 61 determines that application 6 displayed on touch panel 10 is to be slid toward touch panel 20 and displayed thereon. Multi-application display position management section 71 then instructs application-display control section 73 to perform the slide display operation. Application display control section 73 executes the slide display operation of application 6. In this way, the display of application 6 moves in parallel toward touch panel 20. As a result, as shown in FIG. 5C, application 6 is displayed under object 4 while being dragged and above application 7 on touch panel 20. Further, application 6 is displayed to include object 4 while being dragged. In this state, the user can drop object 4 to application 6 displayed on touch panel 20.

That is, according to information processing apparatus 101, the user drags object 4 using the hand that holds housing 2. Further, when the user drops object 4 to application 6 displayed on touch panel 10 of housing 1, the user may perform an intuitive operation, which is only to tilt housing 2 downward with object 4 being dragged on touch panel 10. Thus, because the display of application 6 is slid and displayed on touch panel 20, the user can drop object 4 to application 6 without dragging the selected object 4 up to touch panel 10. That is, information processing apparatus 101 can solve the above-mentioned problem in that the user cannot drag and drop application 6 that is not displayed in the vicinity of the hand that holds information processing apparatus 101 because the finger of the hand does not reach application 6. Further, information processing apparatus 101 can solve the above-mentioned problem in that the operation error easily occurs due to the discontinuity between the touch panels.

<Operation of Information Processing Apparatus 101>

Figure 7:
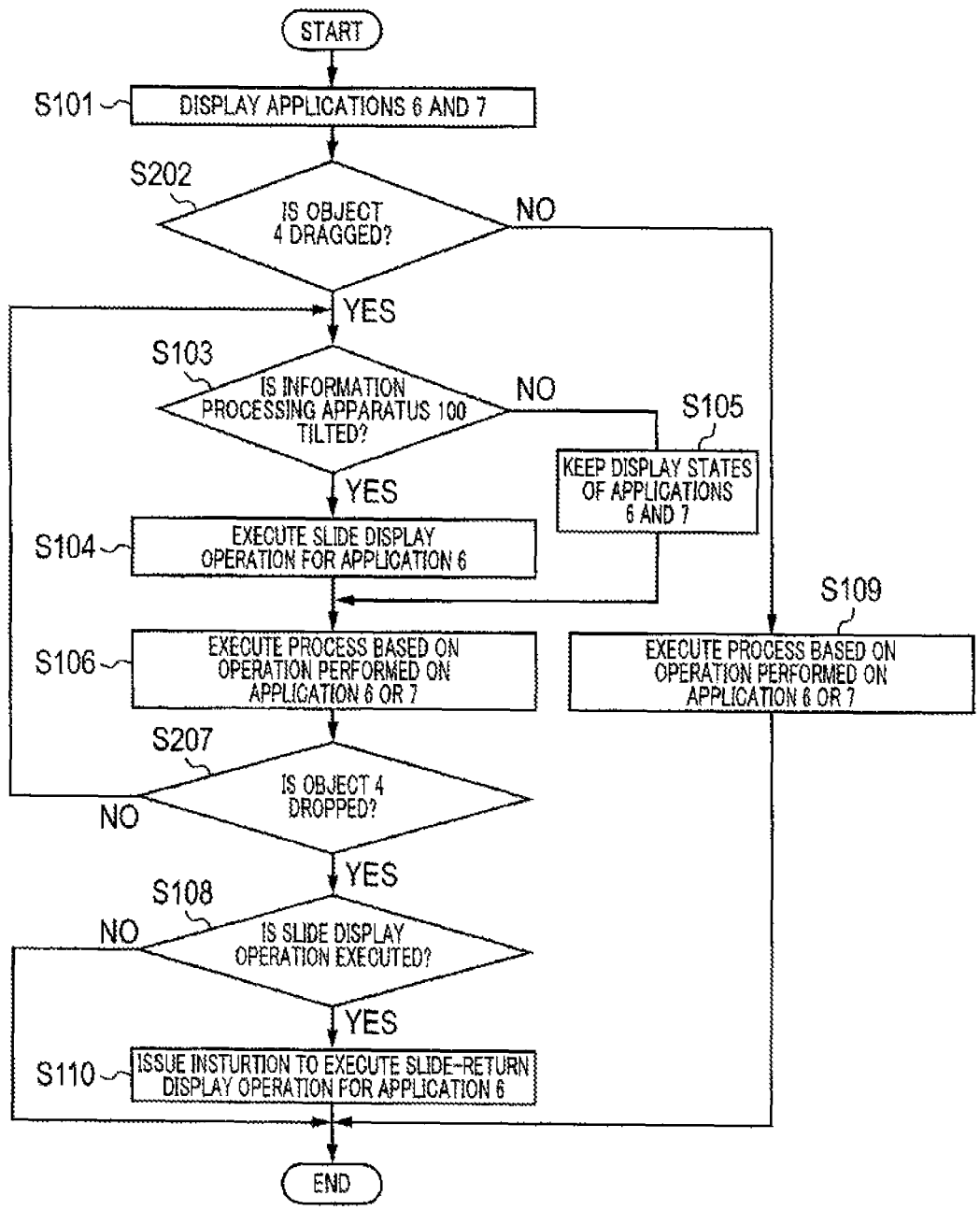
FIG. 7 is a flowchart illustrating an example of an operation of the image forming apparatus according to Embodiment 2 of the present invention.

FIG. 7 is a flowchart illustrating an example of an operation of information processing apparatus 101. Hereinafter, for example, a case where a user operates touch panel 20 by the thumb of the right hand while holding housing 2 by the right hand will be described. In FIG. 7, since the steps other than steps S202 and S207 performed by drag and drop determining section 52 are already described in Embodiment 1 with reference to FIG. 4, description thereof will be omitted.

In step S202, drag and drop determining section 52 determines whether object 4 is dragged on touch panel 20 on the basis of input position information. Here, if object 4 is dragged, drag and drop determining section 52 determines that the slide display operation is enabled.

As a result of determination, if it is determined that the slide display operation is enabled (YES in S202), drag and drop determining section 52 sets the slide-display-operation enabled flag to ON. Further, drag and drop determining section 52 outputs the slide-display-operation enabled flag (ON) to multi-application control section 61 and tilt detection section 30. Further, the procedure proceeds to step S103.

On the other hand, as a result of determination, if it is determined that the slide display operation is not enabled (NO in S202), slide determining section 55 sets the slide-display-operation enabled flag to OFF. Further, drag and drop determining section 52 outputs the slide-display-operation enabled flag (OFF) to multi-application control section 61 and tilt detection section 30.

In step S207, drag and drop determining section 52 determines whether object 4 is dropped on touch panel 20 on the basis of input operation information. Here, if object 4 is dropped, drag and drop determining section 52 determines that the slide display operation is disabled.

As a result of determination, if it is determined that the slide display operation is disabled (YES in S207), drag and drop determining section 52 sets the slide-display-operation enabled flag to OFF, and assigns the above-described flag information. Further, drag and drop determining section 52 outputs the slide-display-operation enabled flag (OFF) to multi-application control section 61 and tilt detection section 30.

On the other hand, as a result of determination, if it is determined that the slide display operation is enabled (NO in S207), drag and drop determining section 52 sets the slide-display-operation enabled flag to ON. Further, drag and drop determining section 52 outputs the slide-display-operation enabled flag (ON) to multi-application control section 61 and tilt detection section 30. Further, the procedure returns to step S103.

According to the operation of information processing apparatus 100 described above, the user drags object 4 using the hand that holds housing 2. Further, when the user drops object 4 to application 6 displayed on touch panel 10 of housing 1, the user may perform an intuitive operation, which is only to tilt housing 2 downward with object 4 being dragged on touch panel 10. Thus, because the display of application 6 is slid and displayed on touch panel 20, the user can drop object 4 to application 6 without dragging the selected object 4 up to touch panel 10. That is, information processing apparatus 101 can solve the above-mentioned problem in that the user cannot drag and drop application 6 that is not displayed in the vicinity of the hand that holds information processing apparatus 101 because the finger of the hand does not reach application 6. Further, information processing apparatus 101 can solve the above-mentioned problem in that the operation error easily occurs due to the discontinuity between the touch panels.

Variations of Embodiment 2

Hereinbefore, the present embodiment has been described, but the description is an example, and various modifications are possible. Variations of the present embodiment can employ the above-described variations of Embodiment 1, which are already described, and thus, description thereof will be omitted.

Other Examples of Slide Display Operation

The slide display operation described in Embodiments 1 and 2 is not limited to the operation described above. Hereinafter, other examples of the slide display operation will be described. FIGS. 8A to 8D are diagrams illustrating examples of the slide display operation that may be applied to Embodiments 1 and 2.

Figure 8A:
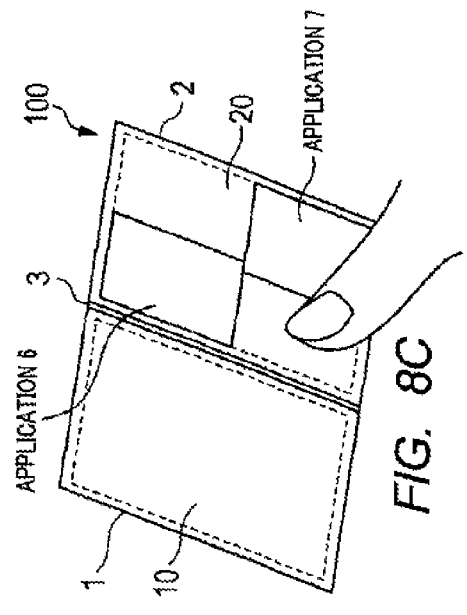
FIGS. 8A to 8D are diagrams illustrating examples of a slide display operation to which the information processing apparatuses according to Embodiments 1 and 2 of the present invention is applicable.

For example, as shown in FIG. 8A, application 6 may be displayed over touch panel 10 and touch panel 20. That is, the slide display operation has only to be performed so that part of application 6 is displayed in a range that a finger of the user can reach (the entirety of application 6 may not be displayed on touch panel 20). In FIG. 8A, application 7 may be displayed in the display state before the slide display operation, or may be displayed in a size smaller than before the slide display operation.

Figure 8C:
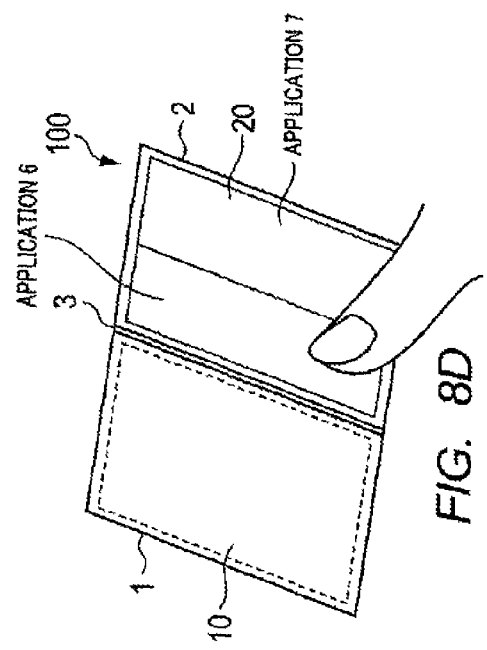
Figure 8B:
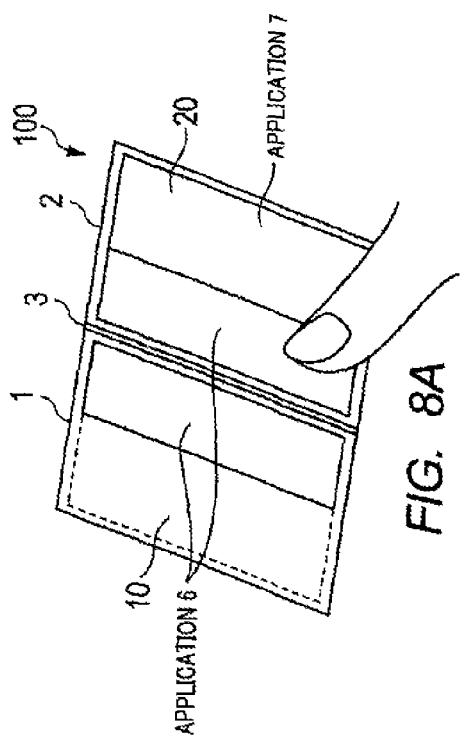
Figure 8D:
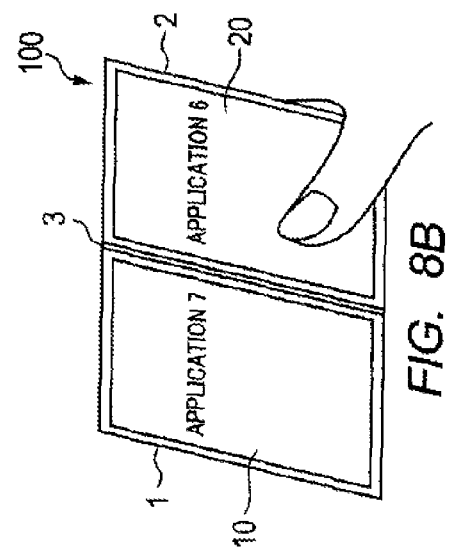

Further, for example, as shown in FIG. 8B, application 6 and application 7 may be exchanged and displayed. Further, for example, as shown in FIG. 8C or 8D, application 6 and application 7 may be reduced in size and displayed so as to fit into touch panel 20.

As described above, according to the slide display operation shown in FIGS. 8A to 8D, the user can operate applications 6 and 7 while viewing applications 6 and 7.

<Hardware Configuration of Information Processing Apparatuses 100 and 101>

Figure 9:
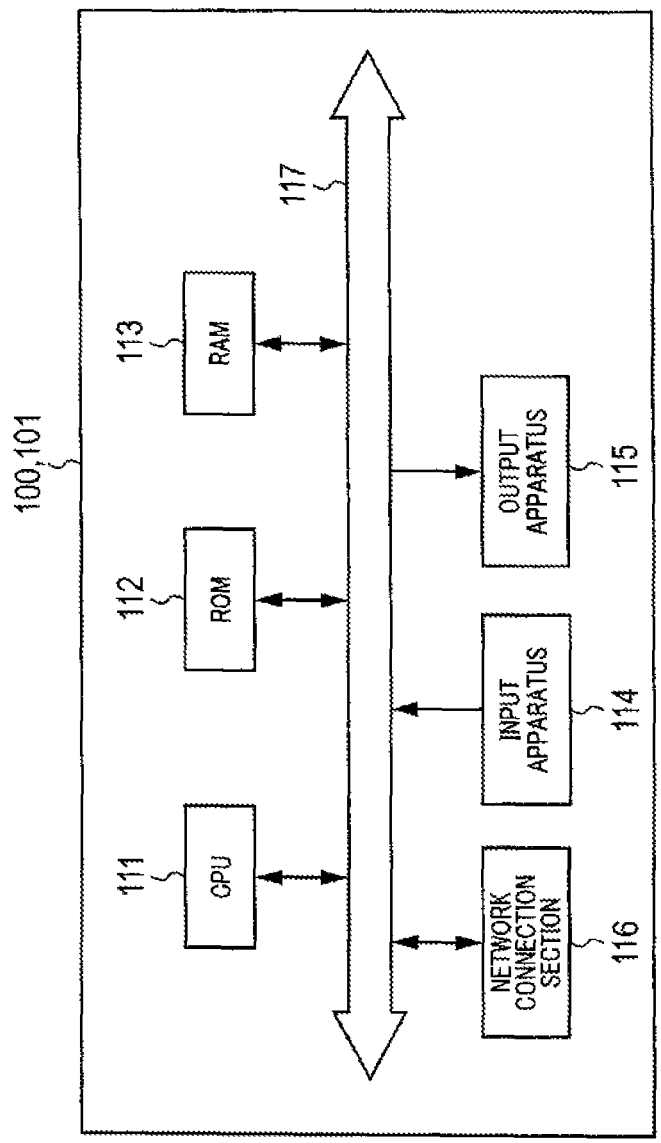
FIG. 9 is an example of a hardware configuration of the information processing apparatuses according to Embodiments 1 and 2 of the present invention.

A hardware configuration example of information processing apparatuses 100 and 101 described in Embodiments 1 and 2 will be described. Information processing apparatuses 100 and 101 each include typical computer hardware. FIG. 9 is a diagram illustrating an example of a hardware configuration of information processing apparatuses 100 and 101.

As shown in FIG. 9, information processing apparatuses 100 and 101 each include central processing unit (CPU) 111, read only memory (ROM) 112, and random access memory (RAM) 113. Further, information processing apparatuses 100 and 101 each include input apparatus 114, output apparatus 115, network connection apparatus 116, and bus 117 that connects these components.

CPU 111 functions as an arithmetic processor and a control apparatus, and controls the entire operations of information processing apparatuses 100 and 101 according to various programs. ROM 112 stores programs, arithmetic parameters or the like to be used by CPU 111. RAM 113 temporarily stores programs to be executed by CPU 111, parameters that are appropriately changed in the execution of the programs, or the like.

For example, the functional components of information processing apparatuses 100 and 101 shown in FIGS. 3 and 6 (for example, tilt detection section 30, touch panel coordinate management section 50, application control section 60, display control section 70 and mode determining section 80) are realized by programs stored in CPU 111 and ROM 112, working areas of RAM 113, and the like.

Input apparatus 114 is an apparatus through which a user inputs information, or an apparatus through which the information processing apparatus obtains predetermined information. For example, input detection sections 11 and 21 and sensor 40 of information processing apparatuses 100 and 101 shown in FIGS. 3 and 6 correspond to input apparatus 114.

Output apparatus 115 is an apparatus for outputting information to user. For example, image display sections 12 and 22 of information processing apparatuses 100 and 101 shown in FIGS. 3 and 6 correspond to output apparatus 115.

Network connection apparatus 116 is an interface for connection to a predetermined network (for example, a mobile phone communication network, a wireless LAN or the like).

An information processing apparatus according to this disclosure is an information processing apparatus including a touch panel that simultaneously displays a plurality of applications in a row, the information processing apparatus including: a detection section that detects whether or not the information processing apparatus is tilted; and a control section that performs, when the information processing apparatus is tilted, a first display control for moving a first application displayed in a first region located higher than a second region in the touch panel toward a second application displayed in the second region located lower than the first region in the touch panel.

The information processing apparatus according to this disclosure further includes a determining section that determines whether or not an enabling operation to enable a display control for the applications is received, in which when the determining section determines that the enabling operation is received, the detection section detects whether or not the information processing apparatus is tilted.

In the information processing apparatus according to this disclosure: the determining section determines whether or not a disabling operation to disable the display control for the applications is received after the first display control is performed; and when the disabling operation is received, the control section performs a second display control for moving the first application that has been moved toward the second application to an original position and for displaying the first application on the original position.

In the information processing apparatus according to this disclosure, the determining section determines that the enabling operation is received, upon reception of drag of an object, and the determining section determines that the disabling operation is received, upon reception of drop of the object.

In the information processing apparatus according to this disclosure: the detection section detects a tilt angle of the information processing apparatus when detecting that the information processing apparatus is tilted; and when performing the first display control, the control section changes a moving speed of the first application when the first application is moved toward the second application and displayed, based on the tilt angle of the information processing apparatus.

The information processing apparatus according to this disclosure further includes a determining section that determines whether or not a plurality of applications are simultaneously displayed, in which the detection section detects whether or not the information processing apparatus is tilted, when a plurality of applications are simultaneously displayed.

In the information processing apparatus according to this disclosure, the touch panel includes a first touch panel and a second touch panel that display the plurality of applications.

In the information processing apparatus according to this disclosure, the control section displays the first application while superimposing part or all of the first application on the second application, when moving the first application toward the second application.

In the information processing apparatus according to this disclosure, the control section moves and displays the first application in the region where the second application is originally displayed, and moves and displays the second application in the region where the first application is originally displayed.

In the information processing apparatus according to this disclosure, the control section reduces in size and displays the first application and the second application so that the first application and the second application fit into the region where the second application is originally displayed, when moving the first application toward the second application.

An information processing method according to this disclosure is an information processing method to be performed by a terminal including a touch panel that simultaneously displays a plurality of applications in a row, the information processing method including: detecting whether the terminal is tilted; and performing, when the terminal is tilted, a first display control for moving a first application displayed in a first region located higher than a second region in the touch panel toward a second application displayed in the second region located lower than the first region in the touch panel.

An information processing program according to this disclosure is an information processing program causing a computer of a terminal to execute processing, the terminal including a touch panel that simultaneously displays a plurality of applications in a row, the information processing program causing the computer to execute the processing including: detecting whether or not the terminal is tilted; and performing, when the terminal is tilted, a first display control for moving a first application displayed in a first region located higher than a second region in the touch panel toward a second application displayed in the second region located lower than the first region in the touch panel.

The disclosure of Japanese Patent Application No. 2012-119643, filed on May 25, 2012, including the specification, drawings, and abstract, is incorporated herein by reference in its entirety.

INDUSTRIAL APPLICABILITY

The present disclosure is useful for an information processing apparatus, an information processing method and an information processing program applied to a terminal that includes a touch panel.

REFERENCE SIGNS LIST 1, 2 Housing
3 Hinge
4 Object
6, 7 Application
10, 20 Touch panel
11, 21 Input detection section
12, 22 Image display section
30 Tilt detection section
40 Sensor
50 Touch panel coordinate management section
51 Touch panel control section
52 Drag and drop determining section
55 Slide determining section
60 Application control section
61 Multi-application control section
70 Display control section
71 Multi-application display position management section
72, 73 Application display control section
74 Division display control section
80 Mode determining section
100, 101 Information processing apparatus
111 CPU
112 ROM
113 RAM
114 Input apparatus
115 Output apparatus
116 Network connection section
117 Bus

The invention claimed is:

1. An information processing apparatus including a touch panel that simultaneously displays at least two applications of a plurality of applications in a row, the information processing apparatus comprising:
 a detection section that detects whether or not the information processing apparatus is tilted to determine which one of the at least two applications is located higher than the other; and
 a control section that performs, based on a determination result of the detection section, a first display control for moving a first application that is displayed while being located higher in the touch panel, toward a second application that is displayed while being located lower in the touch panel.

2. The information processing apparatus according to claim 1, further comprising a determining section that determines whether or not an enabling operation to enable a display control for the applications is received, wherein when the determining section determines that the enabling operation is received, the detection section detects whether or not the information processing apparatus is tilted.

3. The information processing apparatus according to claim 2, wherein:
the determining section determines whether or not a disabling operation to disable the display control for the applications is received after the first display control is performed; and
when the disabling operation is received, the control section performs a second display control for moving the first application that has been moved toward the second application to an original position and for displaying the first application on the original position.

4. The information processing apparatus according to claim 3, wherein the determining section determines that the enabling operation is received, upon reception of drag of an object, and the determining section determines that the disabling operation is received, upon reception of drop of the object.

5. The information processing apparatus according to claim 1, wherein:
the detection section detects a tilt angle of the information processing apparatus when detecting that the information processing apparatus is tilted; and
when performing the first display control, the control section changes a moving speed of the first application when the first application is moved toward the second application and displayed, based on the tilt angle of the information processing apparatus.

6. The information processing apparatus according to claim 1, further comprising a determining section that determines whether or not the plurality of applications are simultaneously displayed, wherein
the detection section detects whether or not the information processing apparatus is tilted, when the plurality of applications are simultaneously displayed.

7. The information processing apparatus according to claim 1, wherein the touch panel includes a first touch panel and a second touch panel that display the plurality of applications.

8. The information processing apparatus according to claim 1, wherein the control section displays the first application while superimposing part or all of the first application on the second application, when moving the first application toward the second application.

9. The information processing apparatus according to claim 1, wherein the control section moves and displays the first application in the region where the second application is originally displayed, and moves and displays the second application in the region where the first application is originally displayed.

10. The information processing apparatus according to claim 1, wherein the control section reduces in size and displays the first application and the second application so that the first application and the second application fit into the region where the second application is originally displayed, when moving the first application toward the second application.

11. An information processing method to be performed by a terminal including a touch panel that simultaneously displays at least two applications of a plurality of applications in a row, the information processing method comprising:
detecting whether the terminal is tilted to determine which one of the at least two applications is located higher than the other; and
performing, based on a determination result of the detection section, a first display control for moving a first application that is displayed while being located higher in the touch panel, toward a second application that is displayed while being located lower in the touch panel.

12. A non-transitory computer readable storage medium storing an information processing program executed by a computer of a terminal, the terminal including a touch panel that simultaneously displays at least two applications of a plurality of applications in a row, the information processing program comprising:
detecting whether or not the terminal is tilted to determine which one of the at least two applications is located higher than the other; and
performing, based on a determination result of the detection section, a first display control for moving a first application that is displayed while being located higher in the touch panel, toward a second application that is displayed while being located lower in the touch panel.

* * * * *